(12) United States Patent
Kotaki et al.

(10) Patent No.: US 9,702,113 B2
(45) Date of Patent: Jul. 11, 2017

(54) WORK VEHICLE

(71) Applicant: KOMATSU LTD., Tokyo (JP)

(72) Inventors: Hirofumi Kotaki, Hirakata (JP); Masamichi Miyazaki, Neyagawa (JP)

(73) Assignee: KOMATSU LTD., Tokyo (JP)

(*) Notice: Subject to any disclaimer, the term of this patent is extended or adjusted under 35 U.S.C. 154(b) by 0 days.

(21) Appl. No.: 14/774,173

(22) PCT Filed: Apr. 22, 2015

(86) PCT No.: PCT/JP2015/062192
§ 371 (c)(1),
(2) Date: Sep. 10, 2015

(87) PCT Pub. No.: WO2016/038925
PCT Pub. Date: Mar. 17, 2016

(65) Prior Publication Data
US 2016/0312438 A1    Oct. 27, 2016

(51) Int. Cl.
*B60R 1/00* (2006.01)
*E02F 9/16* (2006.01)
*E02F 9/26* (2006.01)
*E02F 9/08* (2006.01)

(52) U.S. Cl.
CPC .............. *E02F 9/16* (2013.01); *B60R 1/00* (2013.01); *E02F 9/0858* (2013.01); *E02F 9/163* (2013.01); *E02F 9/261* (2013.01)

(58) Field of Classification Search
CPC . E02F 9/26; E02F 9/0858; E02F 9/163; E02F 9/261; B60R 1/00

USPC ............. 296/190.09; 348/148; 340/435, 461, 340/686.6
See application file for complete search history.

(56) References Cited

U.S. PATENT DOCUMENTS

| 6,903,288 B2* | 6/2005 | Varga | ..................... H01H 25/04 200/200 |
| 8,412,418 B2* | 4/2013 | Kumagai | ............. E02F 3/7618 382/154 |
| 8,437,920 B2* | 5/2013 | Hobenshield | ............. E02F 9/26 340/438 |
| 2003/0226290 A1* | 12/2003 | Savard | .................. E01C 19/006 37/348 |
| 2006/0207275 A1* | 9/2006 | Janeling | ............. B60H 1/00378 62/239 |
| 2007/0120660 A1 | 5/2007 | Yamada et al. | |
| 2009/0224898 A1* | 9/2009 | Graeve | ..................... E02F 9/16 340/438 |

(Continued)

FOREIGN PATENT DOCUMENTS

| CN | 102482865 A | 5/2012 |
| CN | 104060644 A | 9/2014 |

(Continued)

*Primary Examiner* — Glenn Dayoan
*Assistant Examiner* — Sunsurraye Westbrook
(74) *Attorney, Agent, or Firm* — Drinker Biddle & Reath LLP (57) ABSTRACT

A work vehicle has a cab. A protruding portion is located on an upper side of the cab and protrudes rearward relative to a rear portion of the cab. A surveillance camera is arranged on a rear side of the protruding portion. A surveillance camera is arranged above the surveillance camera, and an optical axis is inclined posterosuperiorly relative to an optical axis of the surveillance camera.

12 Claims, 6 Drawing Sheets

(56) References Cited

U.S. PATENT DOCUMENTS

| | | | |
|---|---|---|---|
| 2009/0259401 A1* | 10/2009 | Edwards | G01S 7/062 |
| | | | 701/301 |
| 2012/0146361 A1 | 6/2012 | Nagami et al. | |
| 2013/0107047 A1* | 5/2013 | Sherlock | B60R 1/00 |
| | | | 348/148 |
| 2015/0203034 A1 | 7/2015 | Ishimoto et al. | |

FOREIGN PATENT DOCUMENTS

| | | |
|---|---|---|
| JP | S58-209635 A | 12/1983 |
| JP | S60-082885 U | 6/1985 |
| JP | 2000-213417 A | 8/2000 |
| JP | 2001-295321 A | 10/2001 |
| JP | 2002-294762 A | 10/2002 |
| JP | 2003-154894 A | 5/2003 |
| JP | 2006-035995 A | 2/2006 |
| JP | 2006-336275 A | 12/2006 |
| JP | 2008-296615 A | 12/2008 |
| JP | 2009-167748 A | 7/2009 |
| JP | 2011-231489 A | 11/2011 |
| JP | 2012-172350 A | 9/2012 |
| JP | 5054852 B2 | 10/2012 |
| WO | WO-2005/056320 A1 | 6/2005 |
| WO | WO 2005/064092 A1 | 7/2005 |
| WO | WO 2012-020823 A | 2/2012 |
| WO | WO-2014/020973 A1 | 2/2014 |

\* cited by examiner

WORK VEHICLE

TECHNICAL FIELD

The present invention relates to a work vehicle. In particular, the present invention relates to a work vehicle having a cab and an air conditioner arranged in an upper portion in the rear of the cab.

BACKGROUND ART

For example, Japanese Patent No. 5054852 discloses a work vehicle having a surveillance camera for monitoring the rear of the work vehicle. The surveillance camera picks up an image of the ground in the rear of the work vehicle.

CITATION LIST

Patent Document

PTD 1: Japanese Patent No. 5054852

SUMMARY OF INVENTION

Technical Problem

Some sites of mining have height differences in terrains. At such a site of mining, visual recognition of an area behind and above a work vehicle may be desired. With the surveillance camera described in the document above, however, the ground in the rear of the work vehicle and an area above the work vehicle cannot simultaneously visually be recognized.

The present invention was made in view of the problem above. An object of the present invention is to provide a work vehicle allowing simultaneous visual recognition of the ground in the rear of a work vehicle and an area above the work vehicle.

Solution to Problem

A work vehicle according to the present invention is a work vehicle having a cab. The work vehicle includes a protruding portion, a first image pick-up apparatus, and a second image pick-up apparatus. The protruding portion is located on an upper side of the cab and protrudes rearward from a rear portion of the cab. The first image pick-up apparatus is arranged on a rear side of the protruding portion. The second image pick-up apparatus is arranged above the first image pick-up apparatus and has an optical axis inclined posterosuperiorly relative to an optical axis of the first image pick-up apparatus.

In the work vehicle, the protruding portion serves as an air conditioner. The air conditioner includes a heat exchanger, a top cover, and a fan. The top cover is arranged above the heat exchanger. The fan is arranged between the heat exchanger and the top cover. The fan has a rotation shaft extending along an upward/downward direction of the work vehicle. The first image pick-up apparatus is arranged in the rear of the fan.

In the work vehicle, the fan has an upper plate having an opening. Both of the first image pick-up apparatus and the second image pick-up apparatus are arranged at a position lower than a height position of the upper plate of the fan.

The work vehicle further includes a rectification member having two diverter baffles. The two diverter baffles have front ends connected to each other. An interval between the two diverter baffles increases from the front to the rear in a plan view. The second image pick-up apparatus is located between the two diverter baffles in a plan view.

In the work vehicle, an upper surface of the top cover is higher in height position than an upper surface of the cab.

In the work vehicle, the top cover has a top plate and a rectification portion extending downward from a lower surface of the top plate. The rectification portion is formed integrally with the top plate.

The work vehicle further includes an outlet cover. The outlet cover is arranged in the rear of the fan and has an outlet. The rectification portion has an air shield portion extending between the fan and the outlet cover.

In the work vehicle, the top cover has an exhaust port passing through the top cover.

In the work vehicle, while the work vehicle is arranged on a horizontal ground, the optical axis of the first image pick-up apparatus is inclined downward with respect to the horizontal and the optical axis of the second image pick-up apparatus is inclined upward with respect to the horizontal.

The work vehicle further includes a first display apparatus and a second display apparatus. The first display apparatus displays an image picked up by the first image pick-up apparatus. The second display apparatus displays an image picked up by the second image pick-up apparatus.

In the work vehicle, the cab has an operator seat therein. The first display apparatus is arranged in front of the operator seat and the second display apparatus is arranged in a sidewall of the cab located lateral to the operator seat.

In the work vehicle, the cab has an operator seat therein. The first display apparatus is arranged in front of the operator seat and the second display apparatus is arranged in a sidewall of the cab located above the operator seat.

Advantageous Effects of Invention

According to the present invention, a work vehicle capable of allowing simultaneous visual recognition of the ground behind the work vehicle and an area above the work vehicle and achieving suppression of lowering in volume of sent air.

DESCRIPTION OF EMBODIMENTS

An embodiment of the present invention will be described below with reference to the drawings.

Initially, a configuration of a work vehicle in one embodiment of the present invention will be described. A crawler dozer representing one example of a work vehicle to which the concept of the present invention can be applied will be described below with reference to FIG. 1. The present invention is applicable also to a work vehicle having a cab, such as a hydraulic excavator and a wheel loader, other than the crawler dozer.

In the present example, positional relation of portions will be described with an operator who is seated at an operator seat in a cab being defined as the reference. A fore/aft direction refers to front and rear directions of the operator who is seated at the operator seat. A lateral direction (a width direction) refers to left and right directions of the operator who is seated at the operator seat. An upward/downward direction refers to upward and downward directions of the operator who is seated at the operator seat.

A direction which the operator seated at the operator seat faces is the fore direction, and a direction opposite to the fore direction is the aft direction. The right side and the left side at the time when the operator seated at the operator seat faces the front are defined as a right direction and a left direction, respectively. A foot side of the operator who is seated at the operator seat refers to a lower side and a head side refers to an upper side.

Figure 1:
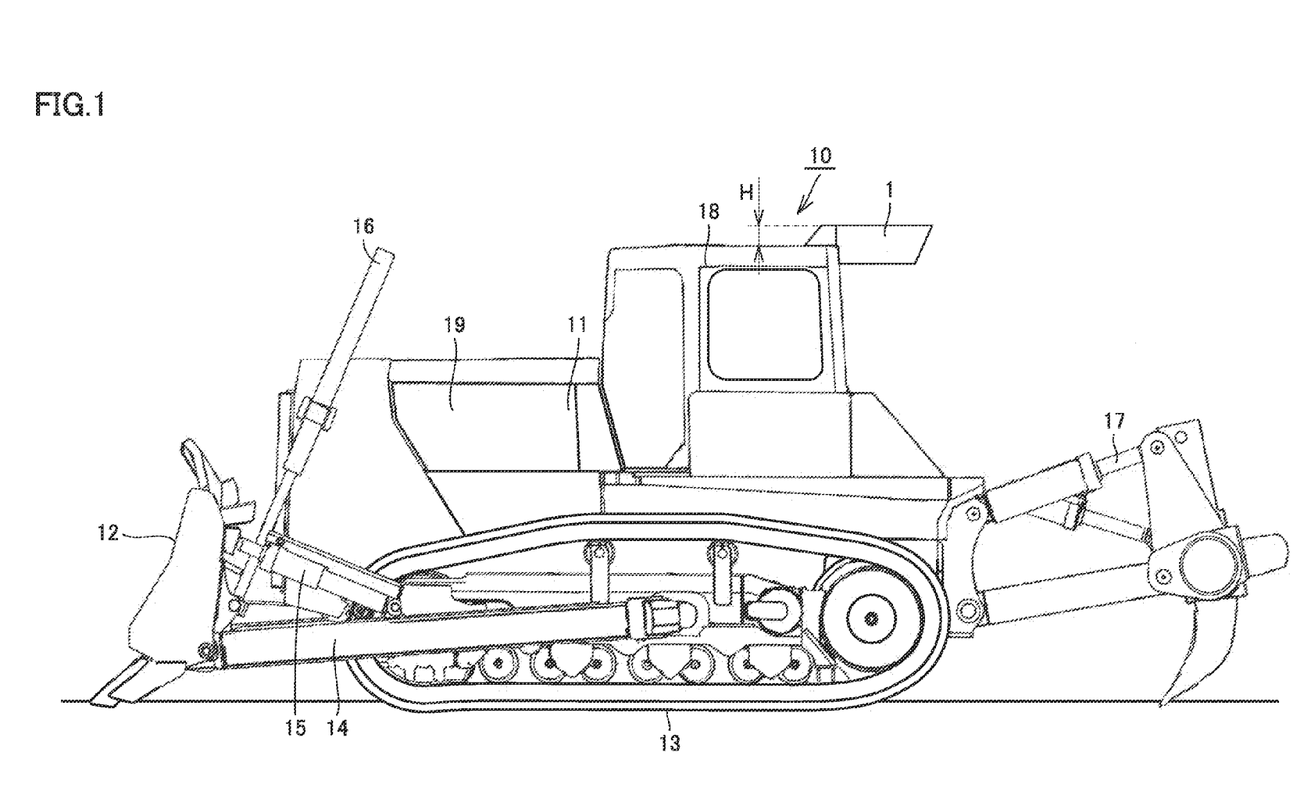
FIG. 1 is a side view schematically showing a configuration of a work vehicle in one embodiment of the present invention.

FIG. 1 is a side view schematically showing a configuration of a work vehicle in one embodiment of the present invention.

As shown in FIG. 1, a crawler dozer 10 in the present embodiment mainly has a traveling apparatus, a vehicular body 11, a dozing blade 12, a ripper apparatus 17, and a protruding portion 1.

The traveling apparatus has a pair of left and right crawler travel units 13. Left and right crawler travel units 13 are separate from each other in the width direction. Vehicular body 11 is arranged between left and right crawler travel units 13. Dozing blade 12 is arranged in front of vehicular body 11. Ripper apparatus 17 is arranged in the rear of vehicular body 11.

Vehicular body 11 has a cab (an operator's cab) 18 and an engine compartment 19. Cab 18 is arranged in the rear of vehicular body 11. Engine compartment 19 is arranged in front of cab 18, between cab 18 and dozing blade 12. Cab 18 has therein, an operator seat where an operator is seated. Cab 18 is constructed to surround the operator seat.

Left and right sides of dozing blade 12 are supported by a frame 14. Dozing blade 12 is provided to be operated by means of a tilt cylinder 15 and a lift cylinder 16. Frame 14 is a member in a quadrangular prismatic shape. Frame 14 has one end attached to a rear surface of dozing blade 12 with a universal joint being interposed. Frame 14 has the other end supported by a side surface of the traveling apparatus. A brace (not shown) has one end attached to substantially the center in the width direction of the rear surface of dozing blade 12 with a universal joint being interposed. The brace has the other end pivotably attached to a side surface of frame 14 on the side of vehicular body 11.

Tilt cylinder 15 has one end supported by the rear surface of dozing blade 12. Tilt cylinder 15 has the other end supported by an upper surface of frame 14. As tilt cylinder 15 extends and contracts with a hydraulic pressure, dozing blade 12 pivots around a support portion implemented by the brace. An angle of inclination of dozing blade 12 is thus adjusted.

Lift cylinder 16 has one end supported by the rear surface of dozing blade 12. Lift cylinder 16 has an intermediate portion supported by a side surface of vehicular body 11. As lift cylinder 16 extends and contracts with a hydraulic pressure, dozing blade 12 moves in the upward/downward direction around the other end of frame 14. A position of dozing blade 12 in the upward/downward direction is thus adjusted.

An air conditioner 1 serves for air conditioning in cab 18. Air conditioner 1 has a function to cool or warm the inside of cab 18. Air conditioner 1 may have a function to change a humidity of air in cab 18 or a function to purify air in cab 18.

Protruding portion 1 protrudes further rearward relative to the rear side of cab 18. Though protruding portion 1 is directly attached to cab 18 in the present embodiment, it may be attached to a member other than cab 18.

In the present embodiment, air conditioner 1 is provided as protruding portion 1. Air conditioner 1 is arranged in an upper portion in the rear of cab 18. Air conditioner 1 protrudes rearward from the upper portion in the rear of cab 18. Air conditioner 1 is arranged on an upper side of a rear window (not shown) of cab 18. The operator can visually inspect the rear of work vehicle 10 through the rear window while the operator is seated at the operator seat in cab 18.

A configuration of air conditioner 1 in the present embodiment will now be described with reference to FIGS. 2 to 5.

Figure 2:
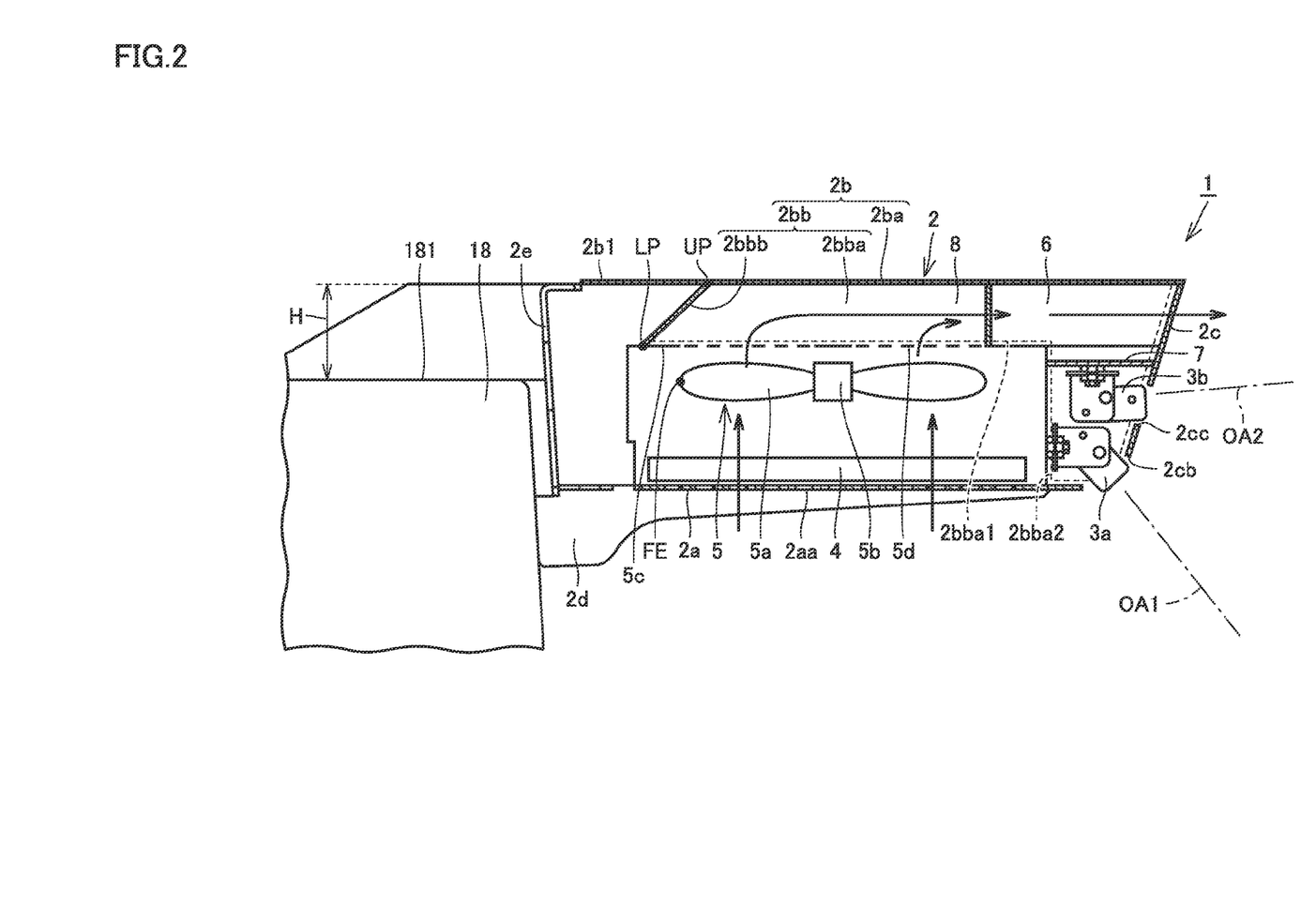
FIG. 2 is a cross-sectional view schematically showing a configuration around an air conditioner in FIG. 1.
Figure 3:
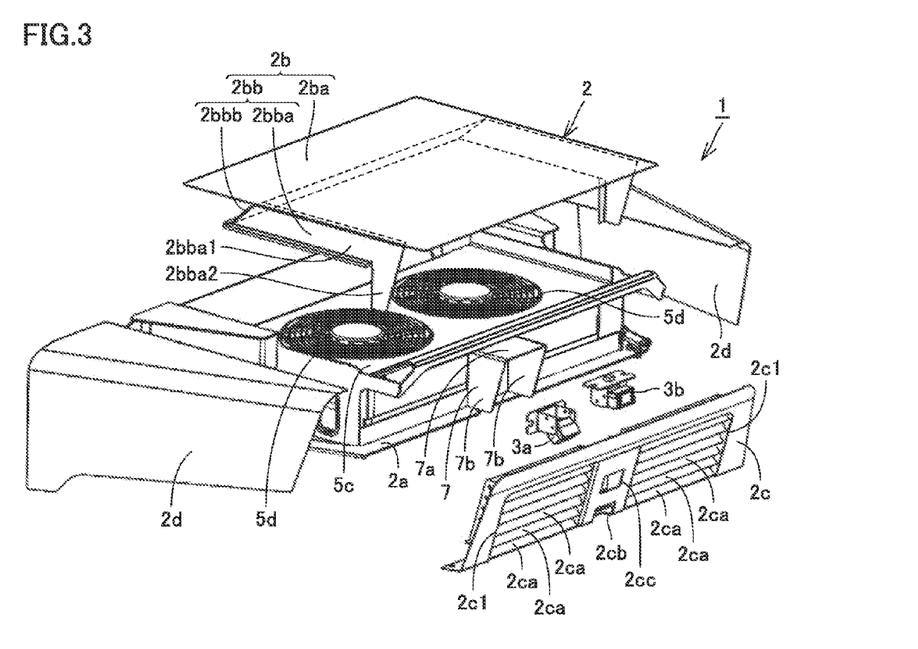
FIG. 3 is an exploded perspective view schematically showing a configuration of the air conditioner in FIG. 1.
Figure 4:
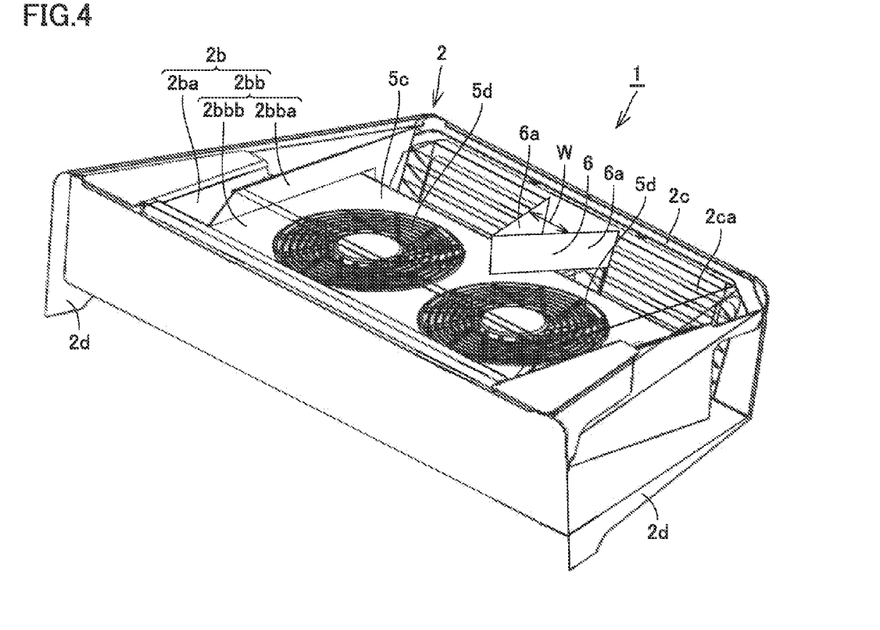
FIG. 4 is an assembly perspective view schematically showing the configuration of the air conditioner in FIG. 1.
Figure 5:
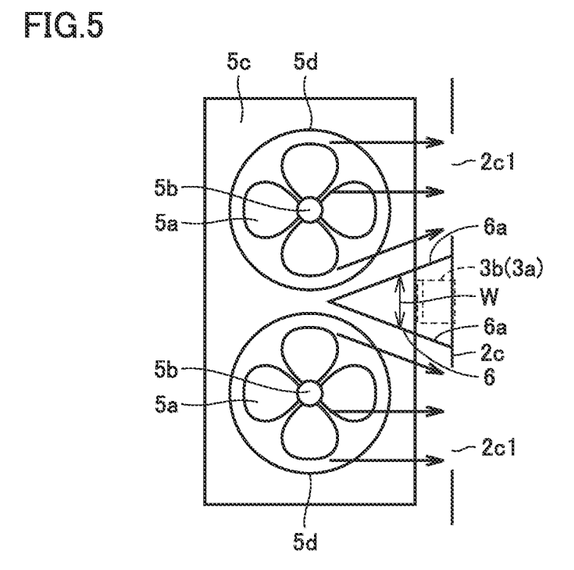
FIG. 5 is a diagram for illustrating a flow of sent air in the air conditioner in FIG. 1.

FIG. 2 is a cross-sectional view schematically showing a configuration around the air conditioner in FIG. 1. FIGS. 3 and 4 are an exploded perspective view and an assembly perspective view schematically showing the configuration of the air conditioner in FIG. 1, respectively. FIG. 5 is a diagram for illustrating a flow of sent air in the air conditioner in FIG. 1.

As shown in FIG. 2, air conditioner 1 in the present embodiment mainly has an air conditioner case 2, a surveillance camera (a first image pick-up apparatus) 3a, a surveillance camera (a second image pick-up apparatus) 3b, a heat exchanger 4, a fan 5, a rectification member 6, and an air shield cover 7.

Air conditioner case 2 has a bottom plate 2a, a top cover 2b, an outlet cover 2c, a pair of left and right side plates 2d, and a front plate 2e. Bottom plate 2a has a through hole 2aa formed. Top cover 2b is arranged to face bottom plate 2a with a gap lying therebetween.

Top cover 2b has a top plate 2ba and a rectification portion 2bb. Top plate 2ba is formed, for example, from a flat plate. Rectification portion 2bb extends downward from a lower surface of top plate 2ba. Rectification portion 2bb is formed integrally with top plate 2ba.

Rectification portion 2bb has a side surface portion 2bba and a front surface portion 2bbb. Front surface portion 2bbb is inclined with respect to the lower surface of top plate 2ba. With this inclination of front surface portion 2bbb, a lower end LP of front surface portion 2bbb is located in front of an upper end (a portion of connection between front surface portion 2bbb and top plate 2ba) UP of front surface portion 2bbb.

Side surface portion 2bba has a side plate 2bba1 and an air shield portion 2bba2. Side plate 2bba1 is connected to top plate 2ba. Side plate 2bba1 is connected to an end portion of front surface portion 2bbb. Side plate 2bba1 extends in the fore/aft direction. Air shield portion 2bba2 extends downward from a lower end of side plate 2bba1, at a rear end portion of side surface portion 2bba.

Outlet cover 2c is arranged in the rear of bottom plate 2a and top cover 2b.

As shown in FIG. 3, outlet cover 2c has a pair of left and right outlets 2c1. Each of left and right outlets 2c1 passes through outlet cover 2c from a front surface to a rear surface of outlet cover 2c. In each of left and right outlets 2c1, a plurality of louver boards 2ca are arranged. The plurality of louver boards 2ca constitute a louver.

Outlet cover 2c has camera openings 2cb and 2cc. Camera openings 2cb and 2cc are arranged between two outlets 2c1. Camera opening 2cc is arranged above camera opening 2cb.

Camera opening 2cb and camera opening 2cc are arranged separately from each other. Camera opening 2cb and camera opening 2cc may be formed as one opening as being connected to each other.

A pair of left and right side plates 2d is arranged on the left and right in the width direction of bottom plate 2a and top cover 2b.

As shown in FIG. 2, front plate 2e is arranged in front of bottom plate 2a and top cover 2b. Bottom plate 2a, top cover 2b, outlet cover 2c, the pair of left and right side plates 2d, and front plate 2e constitute air conditioner case 2 having an internal space.

Heat exchanger 4 and fan 5 are arranged in air conditioner case 2. Heat exchanger 4 is arranged on bottom plate 2a. Heat exchanger 4 serves, for example, as a condenser. Heat exchanger 4 may serve as an evaporator. Top cover 2b is arranged above this heat exchanger 4.

Fan 5 is arranged between heat exchanger 4 and top cover 2b. Therefore, heat exchanger 4 is arranged under fan 5 and top cover 2b is arranged above fan 5. Fan 5 is arranged between front plate 2e and outlet cover 2c. Outlet cover 2c is arranged in the rear of fan 5.

Fan 5 has an impeller 5a. Fan 5 may have a plurality of (for example, two: FIG. 5) impellers 5a. Impeller 5a can rotate around a rotation shaft 5b. Rotation shaft 5b extends along the upward/downward direction of the work vehicle. Lower end LP of front surface portion 2bbb is located in front of a front end FE of impeller 5a.

Rotation shaft 5b extends along the upward/downward direction. Whereby, the rotation shaft extends in such a direction that air sent from fan 5 does not directly impinge on surveillance camera 3a and surveillance camera 3b but directly impinges on top cover 2b. Therefore, rotation shaft 5b extending along the upward/downward direction includes a state that rotation shaft 5b extends in a direction perpendicular to a horizontal plane (the vertical direction) and a state that rotation shaft 5b extends in a direction displaced from the vertical direction while a work vehicle is arranged on the horizontal ground.

Rotation shaft 5b is connected to a drive source (not shown). The drive source is, for example, a motor, however, it is not limited to the motor. The drive source may be arranged in fan 5. The drive source may be arranged outside fan 5.

Fan 5 has an upper plate 5c. An opening 5d is formed in upper plate 5c. Air in fan 5 is sent out of fan 5 through opening 5d. A gap 8 is present between upper plate 5c of this fan 5 and top cover 2b. This gap 8 serves as a flow path for allowing air sent from fan 5 to flow. The sent air flows to the rear of fan 5 through gap 8.

Surveillance camera 3a and surveillance camera 3b are arranged in the rear of fan 5. Surveillance camera 3b is arranged directly above (immediately above) surveillance camera 3a. Surveillance camera 3a is exposed through camera opening 2cb in outlet cover 2c. Surveillance camera 3b is exposed through camera opening 2cc in outlet cover 2c.

While the work vehicle is arranged on the horizontal ground, an optical axis OA1 of surveillance camera 3a is inclined downward with respect to the horizontal. While the work vehicle is arranged on the horizontal ground, an optical axis OA2 of surveillance camera 3b is inclined upward with respect to the horizontal. The optical axes of surveillance camera 3a and surveillance camera 3b are oriented to the rear of the work vehicle. Optical axis OA2 of surveillance camera 3b is inclined posterosuperiorly relative to optical axis OA1 of surveillance camera 3a.

As shown in FIGS. 2 and 3, air shield cover 7 is arranged in the rear of fan 5. Air shield cover 7 is attached, for example, to a side portion on the rear side of fan 5. Air shield cover 7 has a top plate 7a and a pair of left and right side plates 7b. Each of left and right side plates 7b extends downward from each of opposing ends of top plate 7a.

Air shield cover 7 covers surveillance camera 3a and surveillance camera 3b from above and from the side. Air shield cover 7 prevents air sent from fan 5 from impinging on each of surveillance camera 3a and surveillance camera 3b.

Each of surveillance camera 3a and surveillance camera 3b is arranged in the rear of at least one of heat exchanger 4 and fan 5. Each of surveillance camera 3a and surveillance camera 3b is arranged at a position lower than a height position of upper plate 5c of fan 5.

As shown in FIG. 4, rectification member 6 is arranged in air conditioner case 2. Rectification member 6 is attached, for example, to outlet cover 2c. Rectification member 6 is arranged in front of outlet cover 2c. Rectification member 6 is arranged over upper plate 5c of fan 5 and air shield cover 7.

As shown in FIG. 5, in a plan view, rectification member 6 is arranged between two openings 5d. Two openings 5d are arranged above two respective impellers 5a. Rectification member 6 has two diverter baffles 6a. Front ends of two diverter baffles 6a are connected to each other. In a plan view, an interval W between two diverter baffles 6a increases from the front to the rear. In a plan view, surveillance camera 3a and surveillance camera 3b are located between two diverter baffles 6a.

As shown in FIG. 2, a height position of an upper surface 2b1 of top plate 2ba is higher than a height position of an upper surface 181 of cab 18. There is a height difference H between the height position of upper surface 2b1 of top plate 2ba and the height position of upper surface 181 of cab 18. Upper surface 2b1 of air conditioner 1 is arranged as being displaced upward from upper surface 181 of cab 18.

A display apparatus arranged in the cab will now be described with reference to FIG. 6.

Figure 6:
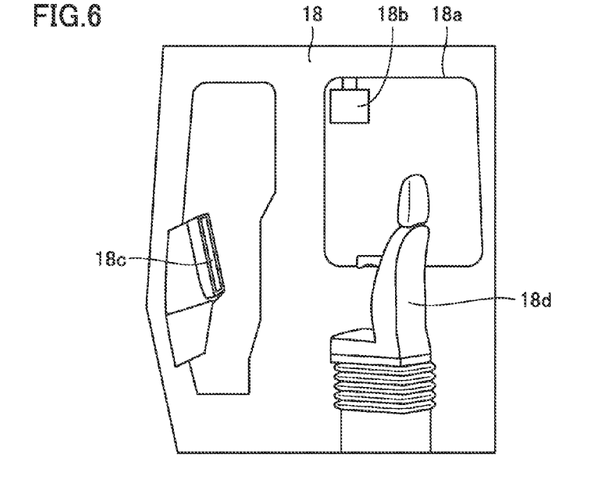
FIG. 6 is a diagram showing a display apparatus arranged in a cab in FIG. 1.

FIG. 6 is a diagram showing the display apparatus arranged in the cab in FIG. 1.

As shown in FIG. 6, a first display apparatus 18c and a second display apparatus 18b are arranged in cab 18. First display apparatus 18c is arranged in front of an operator seat 18d. First display apparatus 18c displays an image picked up by surveillance camera 3a.

Second display apparatus 18b is attached to a sidewall 18a of cab 18. Sidewall 18a of cab 18 is located lateral to operator seat 18d. Second display apparatus 18b is attached to a portion of sidewall 18a of cab 18, which is located above operator seat 18d. Second display apparatus 18b displays an image picked up by surveillance camera 3b.

Figure 7:
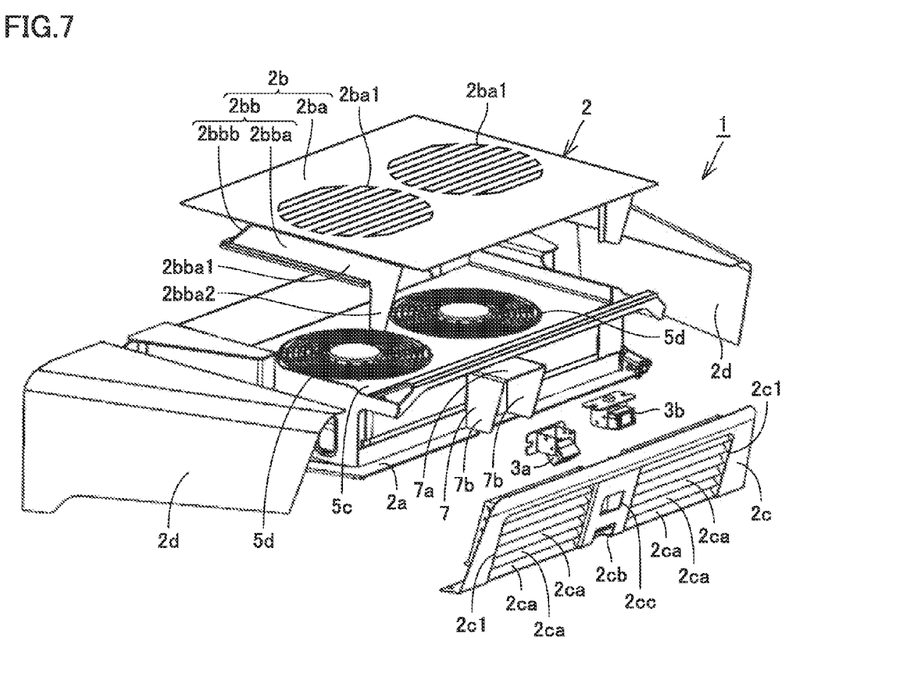
FIG. 7 is an exploded perspective view schematically showing a configuration in which an exhaust port is formed in an upper cover of the air conditioner.

As shown in FIG. 7, an exhaust port 2ba1 may be provided in top plate 2ba of top cover 2b. Some of air sent from fan 5 is blown out of air conditioner 1 through exhaust port 2ba1.

A flow of air in air conditioner 10 in the present embodiment will now be described with reference to FIGS. 2 and 4.

As shown in FIG. 2, with drive by the drive source, impeller 5a rotates. As impeller 5a rotates, air is suctioned from the outside into the inside of air conditioner 1 through through hole 2aa in bottom plate 2a. Air suctioned into air conditioner 1 passes through heat exchanger 4. Thus, heat is exchanged between air which passes through heat exchanger 4 and heat exchanger 4.

Air which has passed through heat exchanger 4 is sent out of fan 5 by impeller 5a through opening 5d in upper plate 5c. Air sent out of fan 5 is directed to top cover 2b and enters gap 8 between upper plate 5c of fan 5 and top cover 2b. The sent air flows to the rear of fan 5 through gap 8.

As shown in FIG. 5, air which has flowed to the rear of fan 5 is diverted to the left and the right in the width direction by rectification member 6. The diverted air is blown out of air conditioner 1 through the pair of left and right outlets 2c1 in outlet cover 2c.

As shown with a dashed line in FIG. 2, air shield portion 2bba2 of side surface portion 2bba is arranged between fan 5 and outlet cover 2c. Therefore, lateral air leakage (in the width direction of work vehicle 10) from between fan 5 and outlet cover 2c is prevented.

A function and effect of the present embodiment will now be described.

According to the present embodiment, as shown in FIG. 2, air conditioner 1 has surveillance camera 3a and surveillance camera 3b. Therefore, surveillance camera 3a can pick up an image of the ground in the rear of work vehicle 10. Surveillance camera 3b can pick up an image of an area above and behind work vehicle 10 Thus, the ground in the rear of work vehicle 10 and the area above work vehicle 10 can simultaneously visually be recognized.

Figure 8:
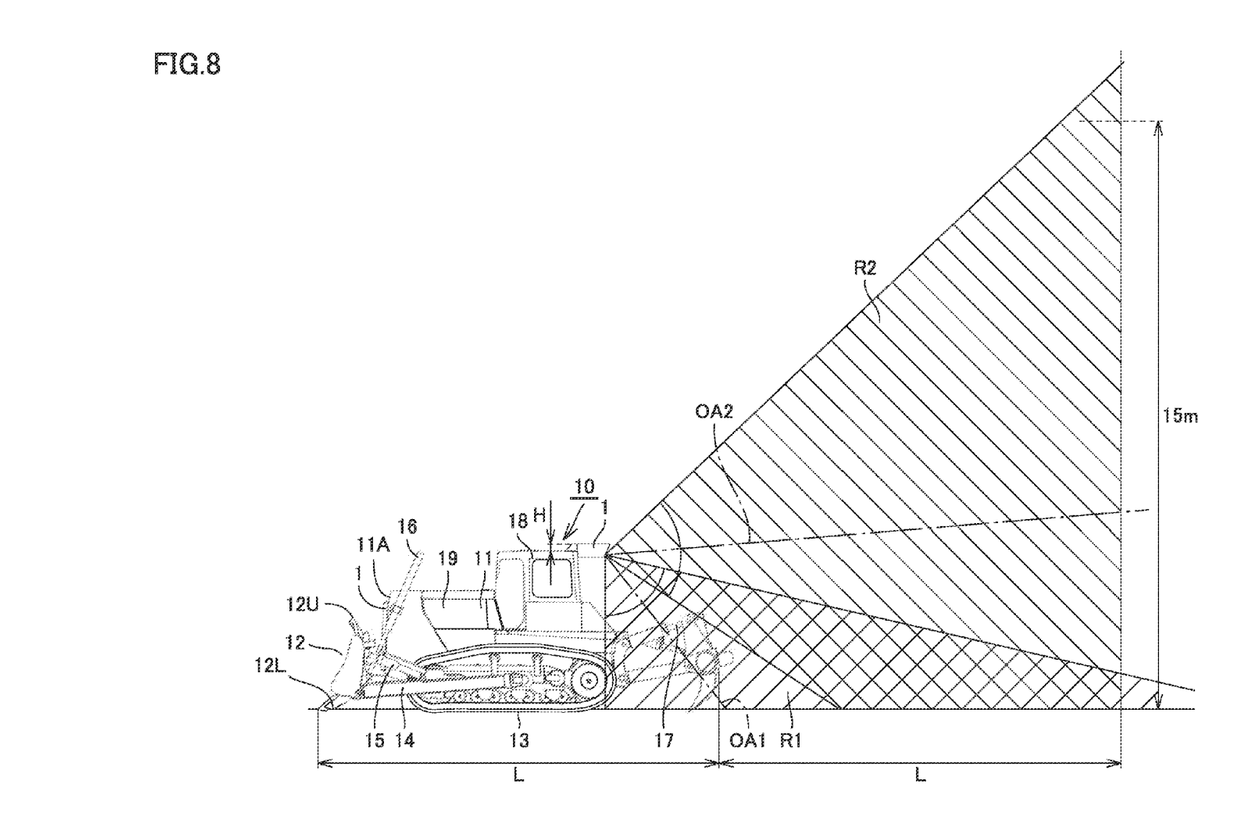
FIG. 8 is a side view showing a range of images picked up by two surveillance cameras.

As shown in FIG. 8, an operator can visually recognize a region R1 (the region shown with hatching extending toward the upper right) with surveillance camera 3a. Thus, the operator can visually recognize a region behind work vehicle 10 by a length L of one vehicle.

The operator can visually recognize a region R2 (the region shown with hatching extending toward the upper left) simultaneously with region R1 with surveillance camera 3b. Thus, the operator can visually recognize an area, for example, up to a height of 15 m behind work vehicle 10 by length L of one vehicle.

As shown in FIG. 2, rotation shaft 5b of impeller 5a of fan 5 extends along the upward/downward direction of work vehicle 10. Therefore, air sent from fan 5 is directed to top cover 2b above fan 5. Sent air is rectified by top cover 2b and thereafter sent to the rear of fan 5 along top cover 2b. Thus, a direction of flow of air sent from fan 5 is changed from upward to rearward by top cover 2b. Therefore, air sent from fan 5 does not travel directly to surveillance camera 3a and surveillance camera 3b. Therefore, in the present embodiment, as compared with a case that air sent from fan 5 travels directly to surveillance cameras 3a and 3b, a flow of air sent to the rear of fan 5 is prevented from being cut off by surveillance cameras 3a and 3b. Thus, reduction in volume of air blown from air conditioner 1 can be suppressed.

Both of surveillance cameras 3a and 3b are arranged at a position lower than the height position of upper plate 5c of fan 5. Thus, the flow of air sent to the rear of fan 5 from between upper plate 5c and top cover 2b of fan 5 is further less likely to be cut off by surveillance cameras 3a and 3b.

As shown in FIG. 5, two diverter baffles 6a of rectification member 6 have front ends connected to each other and interval W between two diverter baffles 6a increases from the front to the rear in a plan view. Thus, a flow of air sent to the rear of fan 5 is prevented from being cut off by surveillance cameras 3a and 3b. Thus, reduction in volume of air blown from the air conditioner can be prevented.

As shown in FIG. 2, upper surface 2b1 of top cover 2b is higher in height position than upper surface 181 of cab 18. Thus, air conditioner 1 is less likely to come into a field of view of an operator in cab 18. Therefore, a range behind and above work vehicle 10 which is visually recognized by the operator increases.

As shown in FIGS. 2 and 3, top cover 2b has rectification portion 2bb. This rectification portion 2bb can rectify air sent from fan 5. Therefore, air can smoothly be sent to the rear of fan 5. Rectification portion 2bb is provided integrally with top plate 2ba. Therefore, as compared with a case that rectification portion 2bb and top plate 2ba are separate from each other, attachment of top cover 2b is facilitated. Therefore, assembly of air conditioner 1 is facilitated.

As shown in FIG. 2, rectification portion 2bb has air shield portion 2bba2 extending between fan 5 and outlet cover 2c. Air shield portion 2bba2 suppresses leakage of sent air from between fan 5 and outlet cover 2c. Thus, such recirculation that sent air which has leaked from between fan 5 and outlet cover 2c passes again through heat exchanger 4 can be suppressed. Turbulence can be suppressed, which may be generated by sent air leaked from between fan 5 and outlet cover 2c.

As shown in FIG. 2, while work vehicle 10 is arranged on the horizontal ground, optical axis OA1 of surveillance camera 3a is inclined downward with respect to the horizontal and optical axis OA2 of surveillance camera 3b is inclined upward with respect to the horizontal. Thus, as shown in FIG. 8, surveillance camera 3a can pick up an image of the ground behind work vehicle 10. Surveillance camera 3b can pick up an image of an area behind and above work vehicle 10.

A frequency of checking of a condition of the ground behind work vehicle 10 is high during work. On the other hand, a frequency of checking of a condition of an area behind and above work vehicle 10 is low during work. Therefore, if both of the ground behind work vehicle 10 and the area behind and above work vehicle 10 are simultaneously displayed on the same display apparatus, operability of an operator will be impaired. Alternatively, if both of the ground behind work vehicle 10 and the area behind and above work vehicle 10 are displayed on the same display apparatus by switching between screens, operability of an operator will again be impaired.

In the present embodiment, as shown in FIG. 6, first display apparatus 18c displays an image picked up by surveillance camera 3a and second display apparatus 18b displays an image picked up by surveillance camera 3b. Therefore, operability of an operator improves as compared with a case that images picked up by two respective surveillance cameras 3a and 3b are displayed on a single display apparatus.

A condition of the ground behind work vehicle 10 of which frequency of checking is high is displayed on first display apparatus 18c in front of operator seat 18d and a condition of the area behind and above work vehicle 10 of which frequency of checking is low is displayed on second display apparatus 18b lateral to operator seat 18d. Therefore, the number of times of checking by an operator of second display apparatus 18b on the side decreases. Therefore, operability of an operator improves. As shown in FIG. 7, top plate 2ba of top cover 2b has exhaust port 2ba1. Thus, some of air sent from fan 5 can be exhausted to the outside of air conditioner 1 through exhaust port 2ba1.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 air conditioner (protruding portion); 2 air conditioner case; 2a bottom plate; 2aa through hole; 2b top cover; 2b1, 181 upper surface; 2ba, 7a top plate; 2ba1 exhaust port; 2bb rectification portion; 2bba side surface portion; 2bba1, 2d, 7b side plate; 2bba2 air shield portion; 2bbb front surface portion; 2c1 outlet; 2c outlet cover; 2ca louver board; 2cb, 2cc camera opening; 2e front plate; 3a, 3b surveillance camera (image pick-up apparatus); 4 heat exchanger; 5 fan; 5a impeller; 5b rotation shaft; 5c upper plate; 5d opening; 6 rectification member; 6a diverter baffle; 7 air shield cover; 8 gap; 10 work vehicle; 11 vehicular body; 12 dozing blade; 13 crawler travel unit; 14 frame; 15 tilt cylinder; 16 lift cylinder; 17 ripper apparatus; 18 cab; 1.8a sidewall; 18b second display apparatus; 18c first display apparatus; 18d operator seat; and 19 engine compartment.

The invention claimed is:

1. A work vehicle having a cab, comprising:
   a protruding portion on an upper side of said cab, which protrudes rearward from a rear portion of said cab;
   a first image pick-up apparatus arranged on a rear side of said protruding portion; and
   a second image pick-up apparatus arranged above said first image pick-up apparatus, which has an optical axis inclined posterosuperiorly relative to an optical axis of said first image pick-up apparatus, wherein
   said protruding portion serves as an air conditioner,
   said air conditioner includes
      a heat exchanger,
      a top cover arranged above said heat exchanger, and
      a fan arranged between said heat exchanger and said top cover and having a rotation shaft extending along an upward/downward direction of said work vehicle, and
   said first image pick-up apparatus is arranged in rear of said fan.

2. The work vehicle according to claim 1, wherein said fan has an upper plate having an opening, and
   both of said first image pick-up apparatus and said second image pick-up apparatus are arranged at a position lower than a height position of said upper plate of said fan.

3. The work vehicle according to claim 1, further comprising a rectification member having two diverter baffles, wherein
   said two diverter baffles have front ends connected to each other, an interval between said two diverter baffles increases from front to rear in a plan view, and said second image pick-up apparatus is located between said two diverter baffles in a plan view.

4. The work vehicle according to claim 1, wherein
   an upper surface of said top cover is higher in height position than an upper surface of said cab, and
   a connection portion between the upper surface of said top cover and the upper surface of said cab includes a step.

5. The work vehicle according to claim 1, wherein
   said top cover has a top plate and a rectification portion extending downward from a lower surface of said top plate, and
   said rectification portion is formed integrally with said top plate.

6. The work vehicle according to claim 5, further comprising an outlet cover arranged in rear of said fan and having an outlet, wherein
   said rectification portion has an air shield portion extending between said fan and said outlet cover.

7. The work vehicle according to claim 1, wherein
   said top cover has an exhaust port passing through said top cover.

8. The work vehicle according to claim 1, wherein
   while said work vehicle is arranged on a horizontal ground, the optical axis of said first image pick-up apparatus is inclined downward with respect to the horizontal and the optical axis of said second image pick-up apparatus is inclined upward with respect to the horizontal.

9. The work vehicle according to claim 1, further comprising:
   a first display apparatus for displaying an image picked up by said first image pick-up apparatus; and
   a second display apparatus for displaying an image picked up by said second image pick-up apparatus.

10. The work vehicle according to claim 9, wherein
    said cab has an operator seat in inside, and
    said first display apparatus is arranged in front of said operator seat and said second display apparatus is arranged in a sidewall of said cab located lateral to said operator seat.

11. The work vehicle according to claim 9, wherein
    said cab has an operator seat in inside, and
    said first display apparatus is arranged in front of said operator seat and said second display apparatus is arranged in a sidewall of said cab located above said operator seat.

12. A work vehicle having a cab, comprising:
    a protruding portion on an upper side of said cab, which protrudes rearward from a rear portion of said cab;
    a first image pick-up apparatus arranged on a rear side of said protruding portion;
    a second image pick-up apparatus arranged above said first image pick-up apparatus, which has an optical axis inclined posterosuperiorly relative to an optical axis of said first image pick-up apparatus; and
    a rectification member having two divertor baffles, wherein
    said two diverter baffles have front ends connected to each other, an interval between said two diverter baffles increases from front to rear in a plan view, and said second image pick-up apparatus is located between said two diverter baffles in a plan view.

* * * * *